United States Patent [19]

Leone

[11] Patent Number: 4,631,376

[45] Date of Patent: Dec. 23, 1986

[54] MOLDED CASE CIRCUIT BREAKER WITH AN IMPROVED ARC GAS EXTERNAL VENTING SYSTEM

[75] Inventor: David A. Leone, Aliquippa, Pa.

[73] Assignee: Westinghouse Electric Corp., Pittsburgh, Pa.

[21] Appl. No.: 655,956

[22] Filed: Sep. 28, 1984

[51] Int. Cl.[4] .................................... H02B 1/08

[52] U.S. Cl. .................................... 200/306; 200/144 R; 137/855

[58] Field of Search .................... 200/306, 144 R; 335/201; 174/16 R, 17 VA; 137/843, 852, 855

[56] References Cited

U.S. PATENT DOCUMENTS

| | | | |
|---|---|---|---|
| 2,505,757 | 5/1950 | Dunbar et al. | 137/855 |
| 3,506,799 | 4/1970 | Ellsworth et al. | 200/144 R |
| 3,707,612 | 12/1972 | Yorgin et al. | 200/306 |
| 3,780,249 | 12/1973 | Harper | 200/144 R |
| 4,261,189 | 4/1981 | Brumfield, Jr., et al. | 200/306 |

*Primary Examiner*—Stephen Marcus
*Assistant Examiner*—Renee S. Luebke
*Attorney, Agent, or Firm*—M. J. Moran

[57] ABSTRACT

A molded case circuit breaker includes an improved system for venting gaseous arc products from the interior of the molded case to the exterior thereof and for preventing the ingress of environmental contaminants. At least one slot is formed through the molded case and a one-way, resilient valve is disposed within the slot.

3 Claims, 5 Drawing Figures

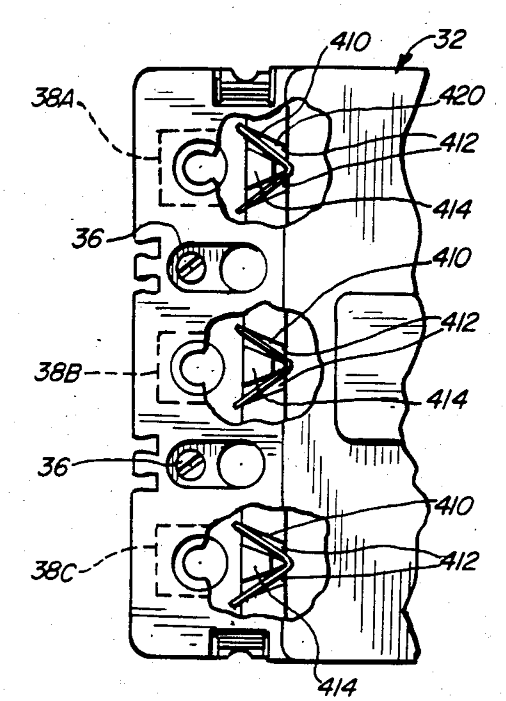
FIG.1
FIG.2
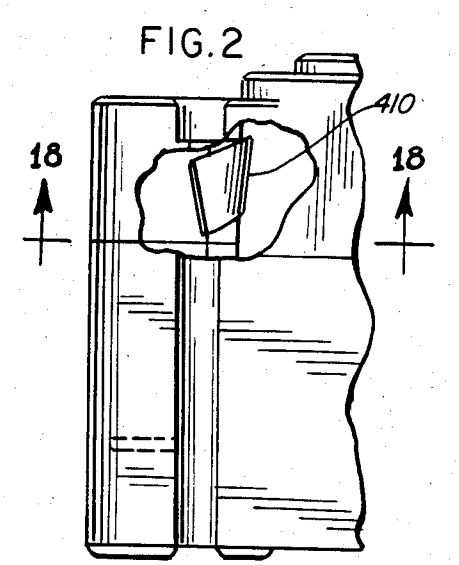
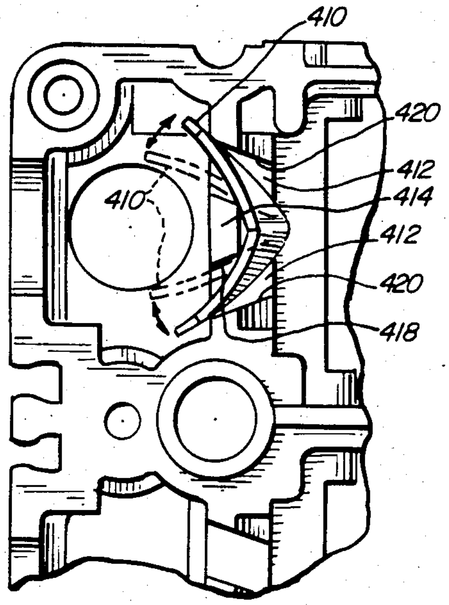
FIG. 3
FIG. 4
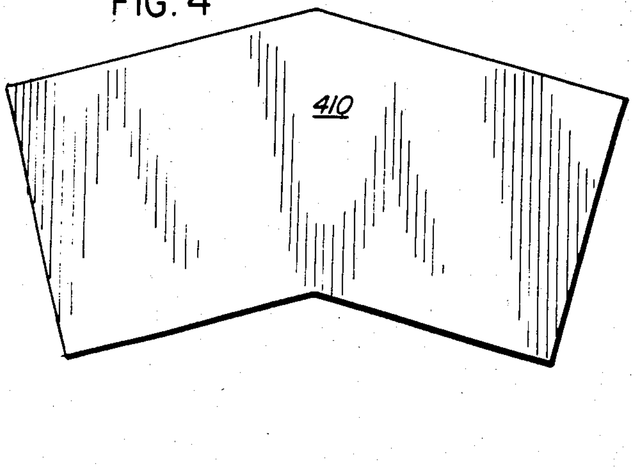
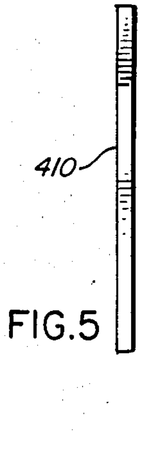
FIG.5

MOLDED CASE CIRCUIT BREAKER WITH AN IMPROVED ARC GAS EXTERNAL VENTING SYSTEM

CROSS REFERENCE TO RELATED APPLICATIONS

The invention disclosed herein relates to molded case circuit breakers. Molded case circuit breaker inventions were disclosed in the following which are assigned to the assignee of the present invention:

| Patent No. | Ser. No. | Filing Date |
|---|---|---|
| 4,053,408 | 440,681 | November 10, 1982 |
| 4,489,295 | 450,857 | December 17, 1982 |
| 4,540,961 | 562,647 | December 19, 1983 |
| 4,539,538 | 562,648 | December 19, 1983 |
| 4,528,531 | 562,643 | December 19, 1983 |
| 4,551,597 | 562,644 | December 19, 1983 |
| 4,554,427 | 562,602 | December 19, 1983 |
| | 562,603 | December 19, 1983 |
| 4,553,116 | 569,058 | January 9, 1984 |
| 4,554,423 | 569,057 | January 9, 1984 |
| 4,554,421 | 569,056 | January 9, 1984 |
| | 569,055 | January 9, 1984 |
| 4,553,115 | 569,054 | January 9, 1984 |
| | 06/655,952 | September 28, 1984 |
| 4,581,511 | 06/655,957 | September 28, 1984 |
| 4,563,557 | 06/655,955 | September 28, 1984 |
| | 06/655,954 | September 28, 1984 |

BACKGROUND OF THE INVENTION

A. Field of the Invention

The device of the present invention generally relates to molded case circuit breakers and, more particularly, to an improved arc gas external venting system for molded case circuit breakers.

B. Description of the Prior Art

Circuit breakers and, more particularly molded case circuit breakers are old and well known in the prior art. Examples of such devices are disclosed in U.S. Pat. Nos. 2,186,251; 2,492,009; 3,239,638; 3,525,959; 3,590,325; 3,614,685; 3,775,713; 3,783,423; 3,805,199; 3,815,059; 3,863,042; 3,959,695; 4,077,025; 4,166,205; 4,257,403; and 4,295,025. In general, prior art molded case circuit breakers have been provided with movable contact arrangements and operating mechanisms designed to provide protection for an electrical circuit or system against electrical faults, specifically, electrical overload conditions, low level short circuit of fault current conditions, and, in some cases, high level short circuit or fault current conditions. Prior art devices have utilized an operating mechanism having a trip mechanism for controlling the movement of an over-center toggle mechanism to separate a pair of electrical contacts upon an overload conditions or upon a short circuit or fault current condition. Such trip mechanisms have included a bimetal movable in response to an overload condition to rotate a trip bar to open a pair of electrical circuit breaker contacts. Such prior art devices have also utilized an armature movable in response to the flow of short circuit or fault current to similarly rotate the trip bar to cause the pair of contacts to separate. Some prior art devices have included an opening in the molded case for venting or exhausting arc gases that result from electrical arcs formed between separating electrical contacts upon an overload of fault current condition. The amount of venting may be critical since too little venting can result in explosion or severe damage to the case and too much venting can cause external flashover. These venting problems are particularly critical in physically small circuit breakers with high interrupting capacities. An additional problem is that foreign material or environmental contaminants can enter the circuit breaker through the opening for venting.

While many prior art devices have provided adequate protection against fault conditions in an electrical circuit, a need exists for dimensionally small molded case circuit breakers capable of fast, effective and reliable operation and, more specifically, for components thereof that provide the necessary external venting of arc gases while preventing the ingress of environmental contaminants.

SUMMARY OF THE INVENTION

An object of the present invention is to provide a new and improved circuit breaker.

Another object of the present invention is to provide a new and improved molded case circuit breaker having an improved system for venting gaseous arc products from the interior of the molded case to the exterior thereof and for minimizing the ingress of any environmental contaminants.

Briefly, the present invention relates to a molded case circuit breaker having a new and improved system for controllably venting gaseous arc products from the interior of the molded case to the exterior thereof and for minimizing the ingress of environmental contaminants. The system includes at least one slot formed through the molded case and a one-way resilient valve disposed in said slot for enabling the exhaustion of arc gases while inhibiting the ingress of environmental contaminants.

BRIEF DESCRIPTION OF THE DRAWING

The above and other objects and advantages and novel features of the present invention will become apparent from the following detailed description of the preferred and alternative embodiments of a molded case circuit breaker illustrated in the accompanying drawing wherein:

FIG. 1 is an enlarged, partial, top elevational view of an arc gas external venting system constructed in accordance with the principles of the present invention;

FIG. 2 is an enlarged, fragmentary, side elevational view of the system of FIG. 1;

FIG. 3 is an enlarged, fragmentary, crosssectional view of the system of FIG. 1 taken along the line 18—18 of FIG. 2; and FIGS. 4 and 5 are enlarged, elevational views of the valve used in the system of FIGS. 1-3.

DESCRIPTION OF THE PREFERRED EMBODIMENT

The present invention is directed to an improved system for venting gaseous arc products from the interior of a molded case circuit breaker to the exterior thereof. A detailed description of a molded case circuit breaker in which the present invention may be utilized is set forth in U.S. Pat. No. 4,528,531 entitled "Molded Case Circuit Breaker With Improved Operating Mechanism" by Flick et al., patented on July 9, 1985 and assigned to the assignee of the present invention and incorporated herein by reference.

In accordance with FIGS. 1-5, an improved system for venting gaseous arc products from the interior of the case to the exterior thereof and for minimizing the ingress of any environmental contaminants is illustrated. Spaced apart portions of a valve 410 are disposed within each of a plurality of spaced apart angled slots 412 about a barrier or post 414 integrally formed in the top cover 32 of the circuit breaker 30. A pair of inclined sidewalls 418 of each post 414 are formed parallel to a plurality of inclined sidewalls 420 to define the spaced apart slots 412. The sidewalls 420 form an acute angle with the portions of the valve 410 disposed within the slots 412. The valve 410 is formed from a unitary, solid, resilient or flexible member or material, such as bone fiber or fishpaper. The thickness of the valve member 412 may be varied to vary the desired amount or the desired rate of external venting (FIGS. 4–5).

In operation, the gaseous arc products generated as a result of electrical arcing between separating electrical contacts 50 and 52 force open the pair of flapper-type valves formed by the spaced apart portions of the valve 410 and allow the gaseous arc products to be vented from the interior of the molded case to the exterior thereof through the openings 412. This operation of the valve 410 is illustrated by the dashed lines in FIG. 3. Following the venting of the gaseous arc products, the resilient valve 410 returns to its initial positions as illustrated in FIG. 1 to minimize the ingress of environmental contaminants. A plurality of three pairs of spaced apart slots 412 and a plurality of three valves 410 (FIG. 1), one pair of slots 412 and one valve 410 for each phase or pole of the circuit breaker 30, may be used to ensure the rapid and effective exterior venting of gaseous arc products from the interior of the circuit breaker 30.

Obviously, many modifications and variations of the present invention are possible in light of the above teachings. Thus, it is to be understood that, within the scope of the appended claims, the invention may be practiced otherwise than as specifically described hereinabove.

What is claimed and desired to be secured by Letters Patent is:

1. An electrical circuit breaker comprising:

a first electrical contact, a second electrical contact, operating means for moving said first and said second electrical contacts into engagement and out of engagement, a molded case for housing the internal components of said circuit breaker, pressure responsive venting means for controllably venting gaseous arc products from the interior of said molded case to the exterior thereof and for minimizing the ingress of environmental contaminants, said venting means comprising a pair of side by side vent slots extending through said case and, said vent slots being defined by sidewalls integrally formed in said case and being separated from each other by a barrier, and one way valve means comprising an elongated resilient member elastically bent around said barrier and having portions on opposite sides of barrier inserted in the respective slots to form a one-way valve in each of said slots.

2. An electrical circuit breaker as recited in claim 1 wherein said resilient member has a predetermined thickness selected to provide a desired degree of venting of said gaseous arc products from said interior of said molded case to the exterior thereof.

3. An electrical circuit breaker as recited in claim 1 wherein said venting means includes second and third one-way valve means substantially identical to said first-mentioned valve means respectively disposed in pairs of slots formed through said case, said first-mentioned and said second and said third valve means being respectively physically disposed in a first phase, a second phase and a third phase of said circuit breaker.

* * * * *